United States Patent
Mehta et al.

(10) Patent No.: US 12,493,613 B2
(45) Date of Patent: Dec. 9, 2025

(54) METHOD AND APPARATUS FOR PROVING A SHARED DATABASE CONNECTION IN A BATCH ENVIRONMENT

(71) Applicant: INTERNATIONAL BUSINESS MACHINES CORPORATION, Armonk, NY (US)

(72) Inventors: Kershaw S. Mehta, Poughkeepsie, NY (US); Thomas John Toomire, Morgan Hill, CA (US); Maryela Evelin Weihrauch, Gaffney, SC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/618,223

(22) Filed: Mar. 27, 2024

(65) Prior Publication Data
US 2025/0307233 A1 Oct. 2, 2025

(51) Int. Cl.
*G06F 16/23* (2019.01)
(52) U.S. Cl.
CPC ................. *G06F 16/2379* (2019.01)
(58) Field of Classification Search
CPC .................................................. G06F 16/2379
See application file for complete search history.

(56) References Cited

U.S. PATENT DOCUMENTS

| | | | |
|---|---|---|---|
| 5,596,745 A * | 1/1997 | Lai | G06F 16/252 709/227 |
| 7,451,434 B1 * | 11/2008 | Blumenthal | G06F 9/544 717/122 |
| 9,129,000 B2 | 9/2015 | Bommireddipalli et al. | |
| 10,250,693 B2 | 4/2019 | Colrain et al. | |
| 10,360,211 B2 | 7/2019 | Bommireddipalli et al. | |
| 10,909,088 B2 | 2/2021 | Colrain et al. | |
| 2002/0065795 A1 * | 5/2002 | Asherman | H04L 67/56 |
| 2004/0015851 A1 * | 1/2004 | Newhook | G06F 9/466 717/116 |
| 2016/0019281 A1 * | 1/2016 | Hariharan | G06F 16/2452 707/783 |
| 2019/0075183 A1 * | 3/2019 | Silberkasten | H04L 67/145 |

* cited by examiner

*Primary Examiner* — Robert W Beausoliel, Jr.
*Assistant Examiner* — Mohammad S Bhuyan
(74) *Attorney, Agent, or Firm* — Onyx IP Group

(57) ABSTRACT

An apparatus provides an operating system service that receives, from an application in a batch environment, a plurality of database transactionality calls associated with a first program of the application, the first program having a first addressability mode. In response to at least one of the plurality of database transactionality calls, the operating system service provides a shared database connection to a database for the first program of the application and for a second program of the application that has a different and second addressability mode. In some implementations, the operating system service provides the shared database connection using one or more of a plurality of callable database transactionality classes, such as a plurality of callable Java classes in a Java archive (JAR) file.

20 Claims, 7 Drawing Sheets

```
┌─────────────────────────────────────────────────────────────────────────────┐
│ Receive, From An Application In A Batch Environment, A Plurality Of Database Transactionality │
│  Calls Associated With A First Program Of The Application, The First Program Having A First   │
│                              Addressability Mode                                               │
│                                     300                                                        │
└─────────────────────────────────────────────────────────────────────────────┘
```

```
┌─────────────────────────────────────────────────────────────────────────────┐
│  In Response To At Least One Of The Plurality Of Database Transactionality Calls, Provide A    │
│ Shared Database Connection To A Database For The First Program Code Of The Application And     │
│ For A Second Program Of The Application That Has A Different And Second Addressability Mode    │
│                                     302                                                        │
└─────────────────────────────────────────────────────────────────────────────┘
```

FIG. 3

METHOD AND APPARATUS FOR PROVING A SHARED DATABASE CONNECTION IN A BATCH ENVIRONMENT

BACKGROUND

The present disclosure relates to methods, apparatus, and products for providing a database connection for an application executing in a batch environment on a computing system.

SUMMARY

According to embodiments of the present disclosure, various methods, apparatus and products provide a shared database connection for programs of different addressability modes in an application executing in a batch environment on a computing system. In some aspects, an apparatus provides an operating system service that establishes the shared database connection on behalf of the programs having different addressability modes and maintains transactionality with the database. In some aspects, an apparatus provides an operating system service that receives, from an application in a batch environment, a plurality of database transactionality calls associated with a first program of the application, the first program having a first addressability mode. In response to at least one of the plurality of database transactionality calls, the operating system service provides a shared database connection to a database for the first program of the application and for a second program of the application that has a different and second addressability mode.

In some implementations, the operating system service provides the shared database connection using one or more of a plurality of callable database transactionality classes, such as a plurality of callable Java classes in a Java archive (JAR) file. In certain implementations, the database transactionality classes are callable when the application is operating in a batch environment and are callable by the first program having the first addressability mode but are not callable by the second program that has the different and second addressability mode, to provide transactional integrity between the programs.

BRIEF DESCRIPTION OF THE DRAWINGS

FIG. 3 sets forth a flowchart of an example method for batch application database connection sharing according to aspects of the present disclosure.

DETAILED DESCRIPTION

Figure 1:
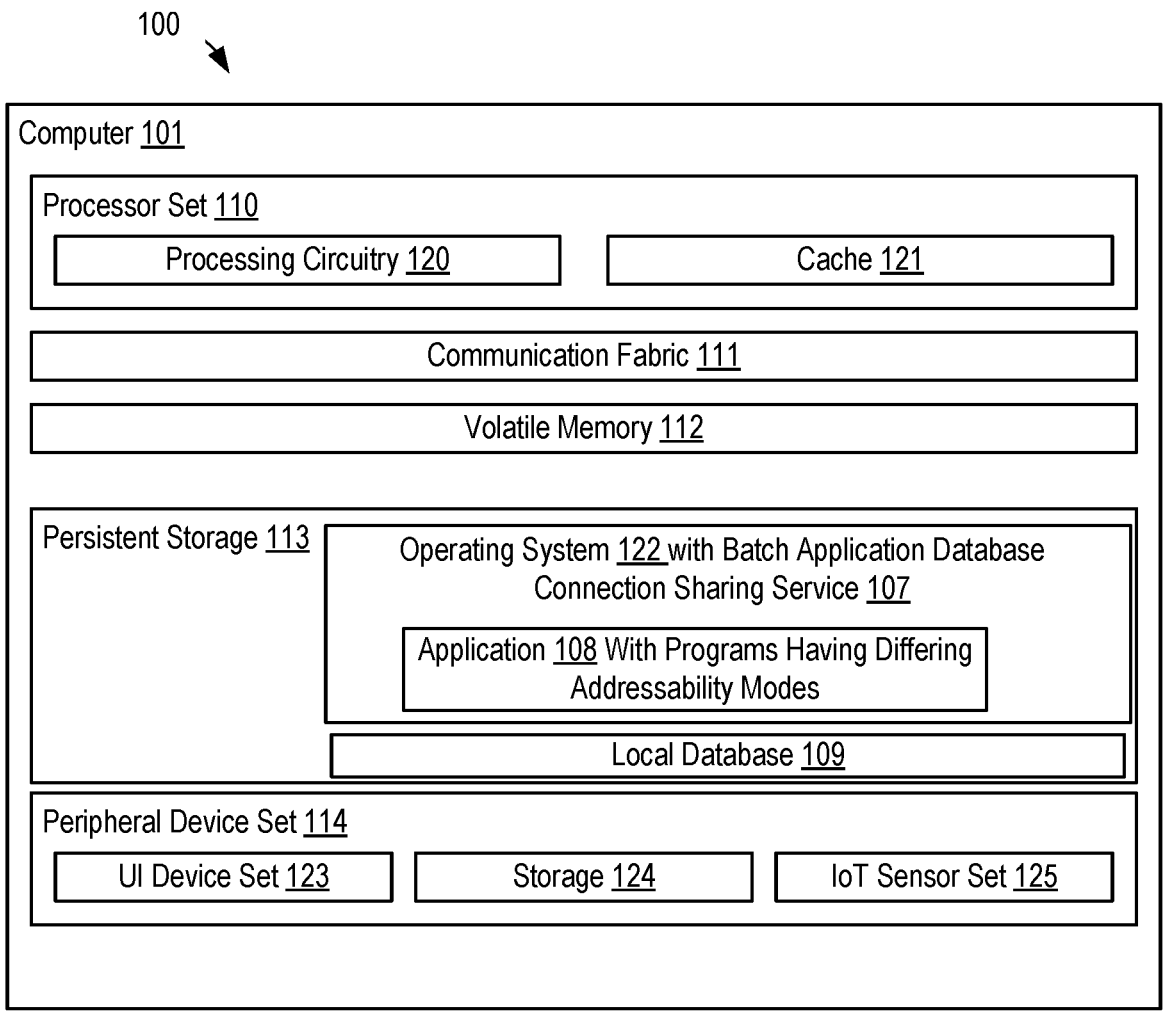
FIG. 1 sets forth an example computing environment according to aspects of the present disclosure.

Applications can operate in different execution environments (e.g., Customer Information Control System (CICS), Information Management System (IMS), Batch) in a computing system. Applications can use execution environment specific services to establish database connections, where the execution environment services and a resource manager help to process transactions such as a specific set of input data that triggers the execution of a specific business application program (a process or job). The message that triggers the application program, and the return of any results, is considered one transaction. However, some environments such as a batch environment, where applications are batched to run together, may not employ resource managers.

Also, applications can use programs of different addressability modes that run as the same thread which includes the same address space (process) and on the same task control block (TCB). Addressing modes (AMODEs) are rules applied in an instruction set architecture (ISA) that refer to the manner in which the operand of an instruction is specified. Computing programs that implement instructions using one addressing mode need to coexist with other computing programs that implement instructions using different addressing modes in the same application. This interoperability of computing programs that utilize different addressing modes is critical for the modernization and scalability of computing systems. For example, applications may have differing programs (program portions) where for example one program is written in a 31 bit legacy mode, and another newer portion of the program for the same application as written in a 64 bit mode. When the programs are executing, they execute for example on the same thread (e.g., same TCB) but when operating in a batch environment where for example there is no resource manager, database transactionality can be negatively affected by either program when two programs of an application attempt to use same database as part of single unit of work.

For example, in a batch execution environment today, a database connection (e.g., for a Db2 database) is established by an application at a thread level (TCB level). This means that a Db2 connection can only be established for a given program and can only be shared with other programs running on that same thread, therefore only programs of the same addressability mode can be used when running in a batch environment. However, under some execution environments (ie. CICS or IMS), a database connection can be shared between programs of different addressability modes, because the execution environment establishes the connection on behalf of the application and works in conjunction with a resource manager to maintain "transactionality".

In a batch environment however, the execution environment does not establish the connection or work in conjunction with a resource manager, therefore this shared connection and maintaining "transactionality" is not allowed.

Disclosed herein is an operating system that maintains database transactionality for batch applications that causes a sharing of a database connection by a plurality of programs in a batch application, each of the plurality of programs having a different addressability mode. The operating system uses a plurality of database transactionality classes that establish the shared database connection on behalf of the programs having different addressability modes and maintain transactionality with the database. In one example the plurality of database transactionality classes are in the form of one or more Java archive (JAR) files and calls to the transactionality classes are made by one of programs when the application is a batch application running in a batch environment.

With reference now to FIG. 1, FIG. 1 sets forth an example computing environment according to aspects of the present disclosure. Computing environment 100 contains an example of an environment for the execution of at least some of the computer code involved in performing the various methods described herein, such as computer code that provides a sharing of a database connection by a plurality of programs in a batch application, each of the plurality of programs having a different addressability mode. In one example, an operating system 122 includes the computer code referred to as batch application database connection sharing service 107 and one or more applications 108 with programs that have differing addressability modes. In this example, the persistent storage 113 includes a local database 109 that is accessed by the programs having differing addressability modes of an application 108. In addition to batch application database connection sharing service 107 computer code, computing environment 100 includes, for example, computer 101 that includes in this embodiment, processor set 110 (including processing circuitry 120 and cache 121), communication fabric 111, volatile memory 112, persistent storage 113 including the operating system 122 and batch application database connection sharing service 107, as identified above along with one or more applications 108 that use the operating system, peripheral device set 114 (including user interface (UI) device set 123, storage 124, and Internet of Things (IoT) sensor set 125). In this example, the application 108 accesses the remote database 109 using the programs with differing addressability modes.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as local database 109. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included for service 107 includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Computer readable program instructions for performing the computer-implemented methods can typically be downloaded to computer 101 from an external computer or external storage device through a network adapter card or network interface. The virtual computing environments (VCEs) typically take the form of virtual machines from a virtual machine set and/or containers from a container set. It is understood that these VCEs may be stored as images and may be transferred among and between the various physical machine hosts, either as images or after instantiation of the VCE.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Figure 2:
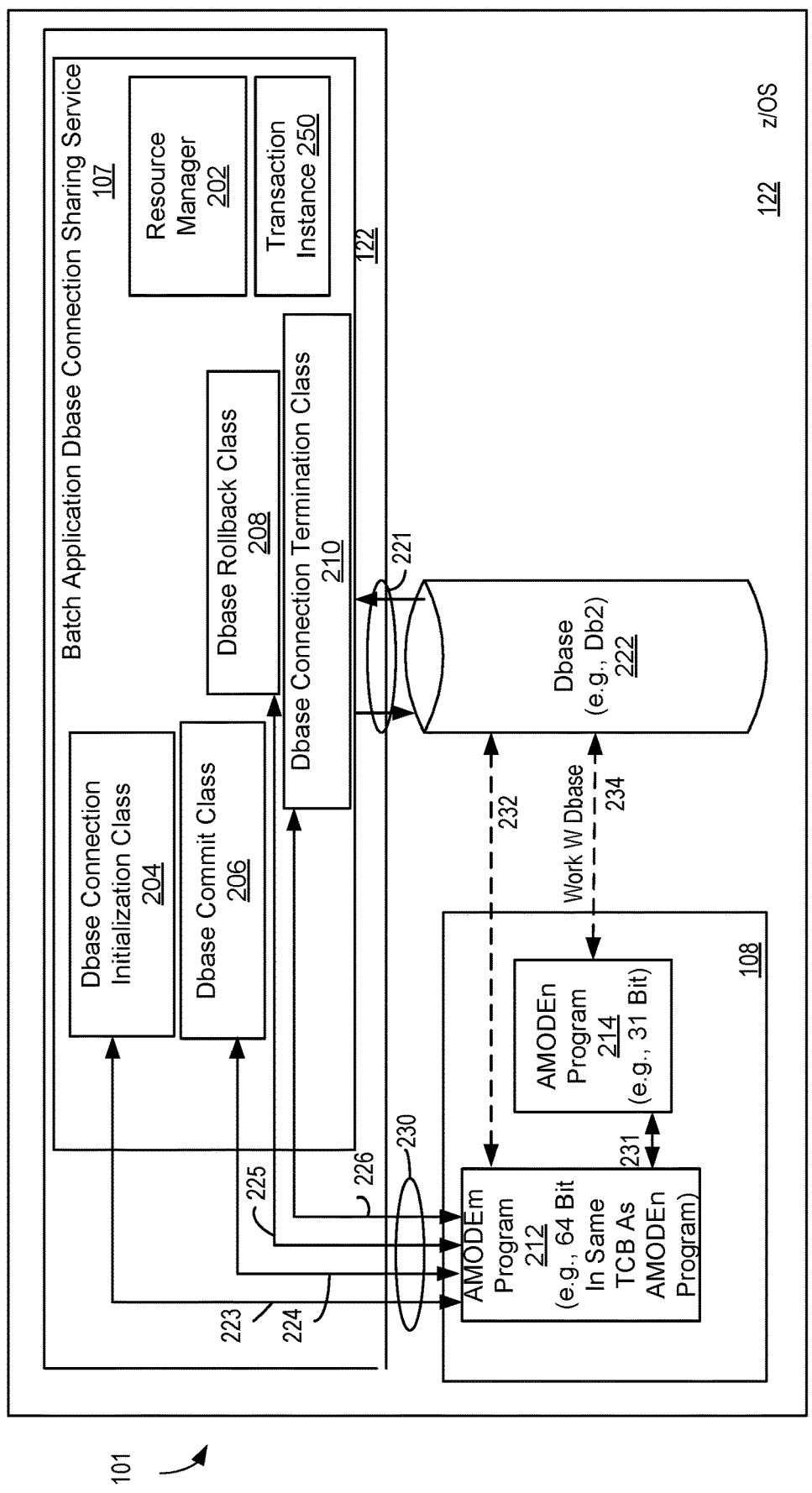
FIG. 2 sets forth an example of an operating system instance with batch application database connection sharing operation according to aspects of the present disclosure.

Referring to FIG. 2, FIG. 2 sets forth an example of the computer 101 with an application operating in a batch environment (batch application) with an operating system instance. The operating system has a batch application database connection sharing service according to aspects of the present disclosure. In this example, the operating system is an z/OS operating system available from IBM® however any suitable operating system may be employed. In this example the database 222 is a local database 109, such as a Db2® Database available by IBM®, however any suitable database may be employed. In this example, the batch application database shared database connection service 107 includes a resource manager 202 and a plurality of database transactionality classes that in this example are runtime computer code modules, such as each being a Java class stored in one or more Java archive files as part of the operating system. However, it will be recognized that the database transactionality classes may be incorporated as part of any suitable component. The operating system, using the batch application database shared database connection service 107, provides the plurality of database transactionality classes that in this example, include a database connection initialization class 204, a database commit class 206, a database rollback class 208 and a database connection termination class 210. The application is executing in a batch address space assigned by the operating system 122.

The batch application 108 by way of example, includes a first program 212, also referred to as address mode M (AMODEm), that uses a 64 bit addressing mode such as may be used by Java programs, and a second program 214, also referred to as address mode N (AMODEn), that uses a different addressing mode such as a 31 bit addressing mode, used for example by legacy programs written in COBOL. However, it will be recognized that any suitable differing addressing modes may be employed.

In this example, each of the plurality of database transactionality classes is callable by the first program 212 having a first addressability mode. The plurality of database transactionality classes are not callable by the second program 214 that has the different addressability mode. For example, the operating system processes calls from the AMODEm program 212 for the database transactionality classes and allows only one program addressability mode call the service 107 and initiate a shared database connection. A call by a program in another addressability mode will fail. This rule enforcement provides integrity between programs of different addressability modes in a batch environment. In one implementation, the Java classes are compiled into the operating system, and when a program in a batch application calls the classes, a JAR file in the OS gets control. The OS only allows one program in a batch application to call the classes but both programs can access the database as needed through a shared database connection.

In response to a received database connection initialization call 223 from the first program 212, the batch application database shared database connection service 107 creates a shared database connection 221 for the first program in the first addressability mode and for the second program in the different and second addressability mode on an application level. In one example the shared database connection uses a Java Database Connectivity (JDBC) class connector to connect to the Db2 database 222, such as a DB2 JDBC Type 2 driver, which serves as an API to connect and execute queries with the database 222. In this example, the JDBC connection is tied to a specific TCB (thread). Hence programs running on that same thread share that connection. When the second program makes database calls (SQL calls), since the connection has been established on that TCB, the second program makes use of the same connection to operate against the database. The DB2 JDBC Type 2 driver is sometimes referred to as the app driver. The app driver name comes from the notion that this driver will perform a native connect to a local database and from its package name (e.g., in an IBM system, COM.ibm.db2.jdbc.app.*). In other words, there is a DB2 client installed on the machine where the application that is making the JDBC calls runs. The JDBC Type 2 driver is a combination of Java™ and native code. Referring also to FIG. 3, FIG. 3 sets forth a flowchart of an example method for batch application database connection sharing using the computer 101 shown in FIG. 2 according to aspects of the present disclosure. In this example as shown in block 300, the method includes receiving, from the application 108 in the batch environment, a plurality of database transactionality calls 230 from the first program 212 of the application 108, the first program having a first addressability mode, such as a Java program with a 64 bit addressing mode. In this example, the program 212 is written to include program code that issues a database connection initialization call 223, a database commit call 224, a database rollback call 225 and a database termination call 226, which are received by service 107 in this example. In this example, the database connection initialization call 223 includes parameters representing a database name and a pseudo transaction name for a unit of work so that a connection to an appropriate database is done and the progress on the unit of work can be tracked.

As shown in block 302, in response to at least one of the plurality of database transactionality calls, such as in response to the database connection initialization call 223, the service 107 provides a shared database connection 221 to the database 222 for the first program of the application and for a second program 214 of the application that has a different and second addressability mode. In this example, both programs run in the same address space in a common task control block provided for the application. Once the shared database connection is provided through the operating system 122 for the batch application 108, work is performed by the programs 212 and 214 as shown by dashed arrows 232 and 234 using the shared database connection 221. Arrow 231 illustrates information being communicated between programs, such as calls, data and other information used by the programs to complete a unit of work.

Figure 4:
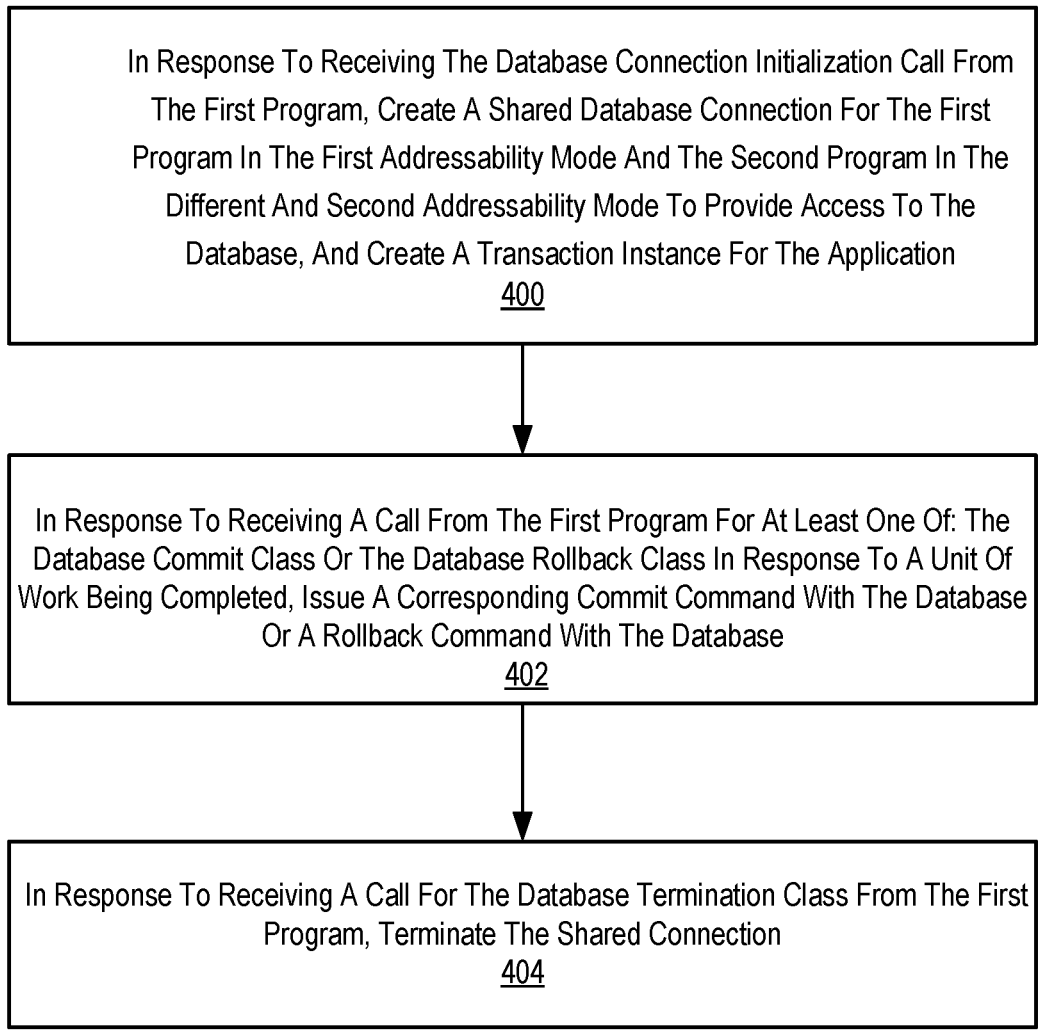
FIG. 4 sets forth a flowchart of another example method for batch application database connection sharing according to aspects of the present disclosure.

Referring also to FIG. 4, FIG. 4 sets forth a flowchart of an example method for batch application database connection sharing from the perspective of the service 107 according to aspects of the present disclosure. In this example, as shown in block 400, the method includes in response to receiving the database connection initialization call 223 from the first program, providing the database connectivity class 204 that creates the shared database connection 221 for both program 212 and program 214. For example, the database connectivity class 204 calls the DB2 JDBC Type 2 driver that creates the shared database connection 221. The database connectivity class 204 also creates a transaction instance 250 for the application by calling the resource manager 202 that creates the transaction instance 250. In response to receiving a call for the database commit class 206 from the first program, the resource manager 202 updates the transaction instance 250 to include new information entered in the database from the shared database connection for the unit of work.

The operating system, such as a z/OS operating system, has a facility for managing system resources, called the resource recovery services (RRS). The RRS is the sync-point manager, which coordinates the update and recovery of multiple protected resources. The RRS controls how and when protected resources are committed by coordinating with the resource managers (such as a customer information control system (CICS) and IMS, Batch) that have registered with the RRS.

The resource manager 202 is used to insure integrity of database access among multiple programs. When the database connection initialization class 204 is called, an instance 250 of the resource manager is created when a connection is created and reestablished with new data associated with the database transactions. The resource manager 202 is set of services that provide a context for resources used to carry out a unit of work. When a database commit or rollback is needed by a program the transaction instance is updated to reflect transactions and resources for a unit of work (UOW). The shared database connection 221 is created for the thread so it does not matter what is running on the thread, both programs 212 and 214 use the same connection for a UOW.

As shown in block 402 in response to receiving a call 224 from the first program for the database commit class 206, the commit class 206 issues a commit command with the database. For example, when the second program wants a completed unit of work committed, the second program calls the first program indicating that a commitment is needed and the first program calls the commit class 206 to affect the commit. Likewise, when the first program wants a unit of work committed, the first program calls the commit class 206 to affect the commit. A similar approach is done for rollbacks. For example, in response to receiving a call 225 to the rollback class 208, the rollback class 208 issues a rollback command with the database. The COMMIT class lets a user save any changes or alterations on the current transaction. These changes then remain permanent in the database. The ROLLBACK class lets a user undo all the alterations and changes that occurred on the current transaction after the last COMMIT. The call to rollback in some implementations comes because the second program wants a rollback of information from the database and informs the first program that a rollback is needed. The first program calls the rollback class when it wants a rollback as well. As shown in block 404, when the unit of work is done by the programs 212 and 214, the first program 212 calls the database termination class 210. In response to receiving the call 226 for the database termination class from the first program, terminate the shared database connection.

Figure 5:
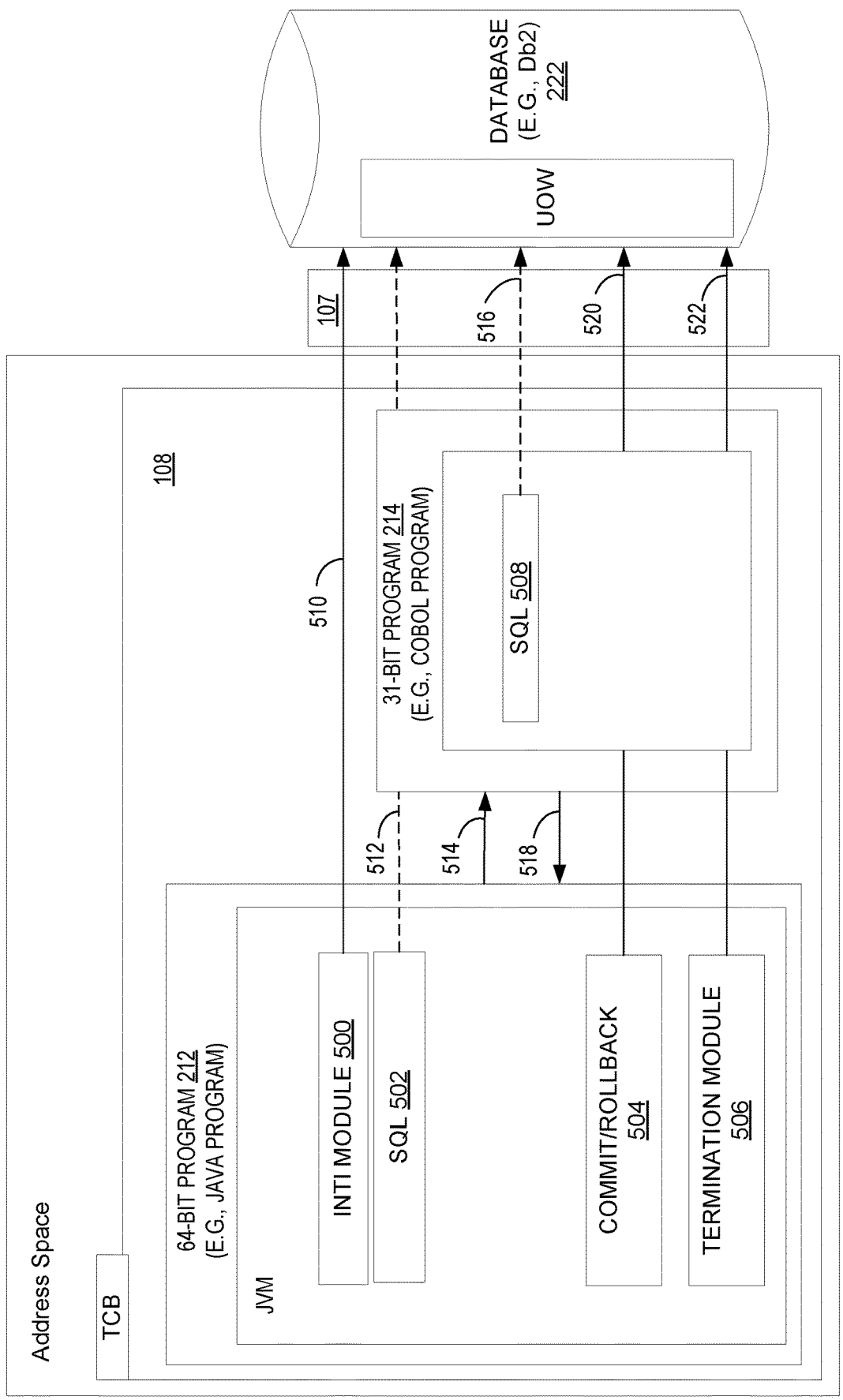
FIG. 5 sets forth a diagram illustrating an example of programs with different addressability modes in a batch application sharing a database connection according to aspects of the present disclosure.
Figure 6:
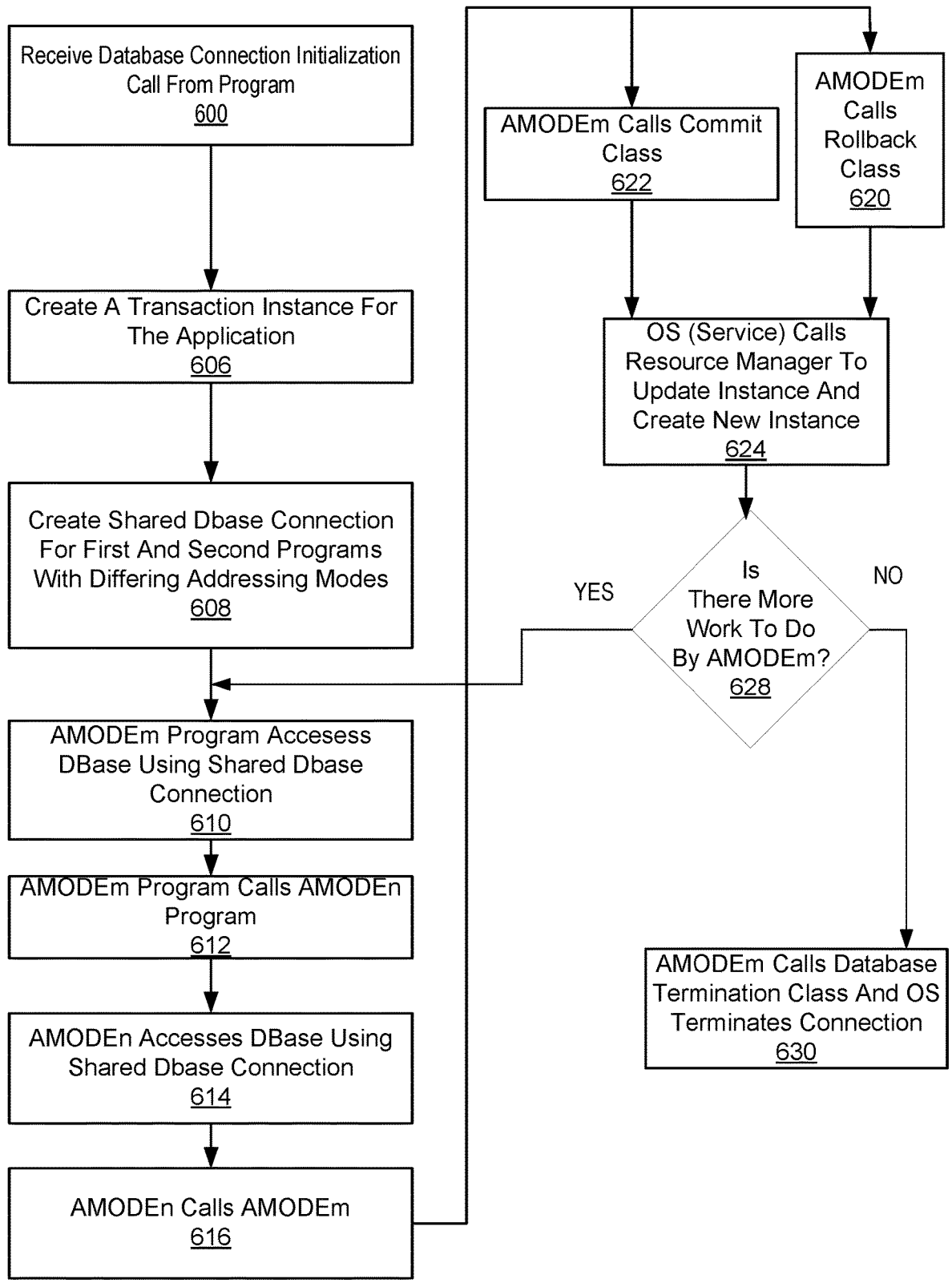
FIG. 6 sets forth a flowchart of another example method for batch application database connection sharing according to aspects of the present disclosure.

Referring to FIG. 5 and FIG. 6, an illustrative diagram and flowchart show an example of programs with different addressability modes in a batch application sharing a database connection that is provided by an operating system such as shown in FIG. 2. In this example the AMODEm program 212 is a Java program that runs in a Java virtual machine (JVM) and is programmed to include executable computer program code such as an initialization module 500 that issues the call 223, a structured query language (SQL) module 502 that issues SQL statements for database transactions with the database, a Java commit module/Java rollback module 504 and a connection termination module 506. The second program 214 includes an SQL module 508. The Java program 212 calls the initialization class 204 before making any call to the database 222. In this example, all database commits and database rollbacks are done by the Java program calling the commit class 206 and rollback class 208 respectively.

For example, as shown in FIG. 6 in block 600 to establish a database connection 510 for the batch application 108 the AMODEm program 212 calls the initialization module 500 to issue the database connection initialization call 223 and the batch application database connection sharing service 107 receives the database connection initialization call 223. As shown in block 606, the method includes calling the database connection initialization class 204 which informs the resource manager 202 to create a transaction instance 250 for the application (e.g., for the thread). As shown in block 608, also in response to the connection initiation call 223, the initialization class 204 creates the shared database connection 221 for the programs 212 and 214 that have different addressing modes. For example, the class includes code that creates a Type 2 JDBC with the Db2 database 222. With the connection made, the AMODEm program accesses the database 222 using the shared database connection.

For example, as shown in block 610, the method includes, beginning a unit of work by accessing the database 222 by the AMODEm program 212 using the shared database connection 221. For example, SQL statements are part of the program source code. After the program is compiled, during execution time, the SQL requests are directly sent to the database 222 using the Type 2 JDBC connection. This is represented by dashed line 512. As shown in block 612, the AMODEm program sends a call 514 to the AMODEn program 214 to hand over database use as part of completing a unit of work using the database. As shown in block 614, the method includes accessing, by the AMODEn program, the database 222 using the shared database connection 221 as part of completing the unit of work. For example, the SQL module 508 sends SQL requests for the database 222 as shown by dashed line 516. As shown in block 616, after the database SQL requests are done as required by the AMODEn program, the AMODEn program 214 issues a call 518 back to the AMODEm program 212.

As shown in block 620, if the call 518 includes a request for a rollback operation with the database, the method includes issuing the rollback call 225, by the AMODEm program 212, to call the database rollback class 208 which sends a database rollback command via the shared database connection to the database to rollback the data from the unit of work from the database. However, if the call 518 includes a request, for a commit operation with the database, as shown in block 622, the method includes issuing the database commit call 224, by the AMODEm program 212, to call the database commit class 206 which sends a database commit command via the shared database connection to the database to commit the data from the unit of work to the database. These operations are done by the Java commit/rollback module 504 shown by arrow 520. As shown in block 624, each of the commit class and the rollback class when called, call the database to commit or rollback the unit of work respectively. Each of the classes call the RRS to establish a new unit of work.

As shown in block 628 more accesses to the database are needed, the process continues for the remaining portions of the unit of work to be completed. When the unit of work is complete, as shown in block 630 AMODEm program 212 issues the database termination call 226 and calls the database termination class 210 to terminate the shared database connection 221 as illustrated by line 522.

Figure 7:
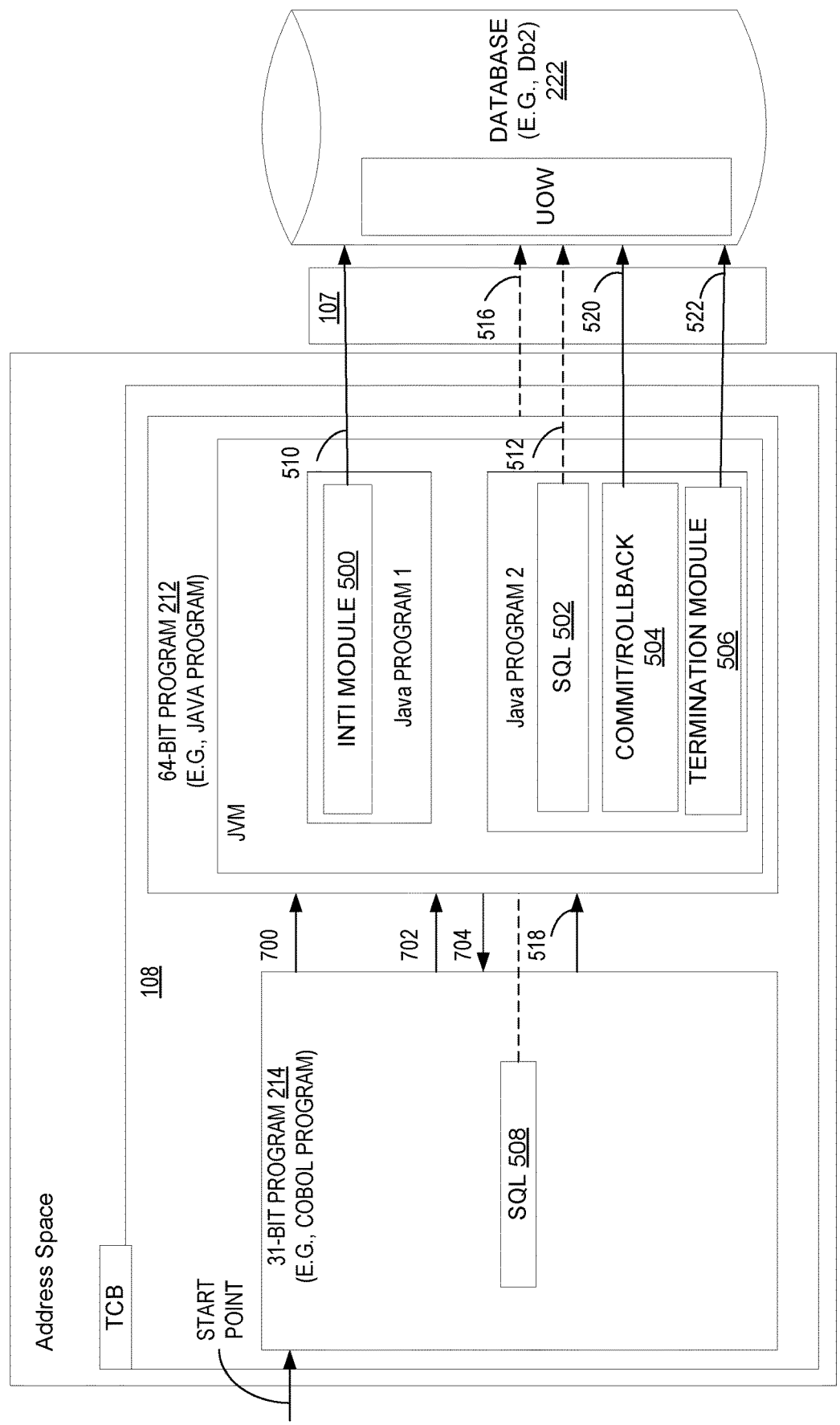
FIG. 7 sets forth a diagram illustrating another example of programs with different addressability modes in a batch application sharing a database connection according to aspects of the present disclosure.

Referring to FIG. 7, FIG. 7 is a diagram illustrating another example of programs with different addressability modes in a batch application sharing a database connection where AMODEn program 214 is the starting point for database access operations in the batch application unlike FIG. 5 which had AMODEm program 212 start the database access operations. In this example, the AMODEn program initializes the AMODEm program 212 shown by arrow 700. The AMODEn program 214 calls the AMODEm program, shown by arrow 702, request that a shared database connection be set up. For example, the AMODEm program receives the request to initialize a database connection from the AMODEn program. In response to receiving the request, the initialization module issue the database connection initialization call 223. In response to the call 223, the database connection initialization class 204 calls the resource manager 202 to create a transaction instance 250. The shared database connection 221 is also created by the class 204 as described above. The initialization module 500 provides a database connection response 704 to the request shown by arrow 702 for the AMODEn program. The AMODEn program accesses the database the SQL module 508 sending SQL requests using the shared database connection 221. When the SQL requests from the AMODEn program are finished for the unit of work, the AMODEn program issues call 518 for the AMODEm program to provide information as needed by the AMODEm program to continue the unit of work.

The AMODEm program accesses the database 222 using the shared database connection as part of completing the unit of work. Depending on whether AMODEm program wants to issue a commit or a rollback, the AMODEm program sends the respective call for the database commit class or the database rollback class in response to a unit of work being completed. When the AMODEm program wants to terminate the connection, the termination module 506 calls the database termination class 210 to terminate the shared database connection.

As set forth herein, among other technical benefits, an operating system framework is provided that provides different "transactionality" classes (also referred to as methods) for use by the application running in batch. For example, in a batch environment, an operating system framework is provided where the application establishes the database connection through the operating system and the application uses new Java database transactionality classes provided by the operating system. In some implementations, the application calls the "transactionality" classes, which in turn call the resource manager to establish and transaction instance. In some implementations, a Java program in a batch application, calls a database connection class which performs a JDBC dB2 Type 2 connection process that provides a JDBC connection with the database for both the Java application and a legacy application that uses a different addressability mode.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method carried out by one or more processing devices comprising:
receiving, from an application in a batch environment, a plurality of database transactionality calls associated with a first program of the application, the first program having a first addressability mode; and
in response to at least one of the plurality of database transactionality calls, providing a shared database connection to a database for the first program of the application and for a second program of the application that has a different and second addressability mode.

2. The method of claim 1, comprising:
providing a plurality of database transactionality classes, each callable by the first program having the first addressability mode.

3. The method of claim 2, wherein providing the plurality of database transactionality classes comprises:
providing a database connection initialization class, and in response to a received database connection initialization call, creating a shared database connection for the first program in the first addressability mode and the second program in the different and second addressability mode on an application level.

4. The method of claim 3, wherein providing the plurality of database transactionality classes further comprises providing a database connection termination class, a database commit class and a database rollback class.

5. The method of claim 4, comprising:
in response to receiving a database connection initialization call from the first program,
creating a transaction instance for the application and providing access to the database by the first program and the second program using the shared database connection;
in response to receiving a call from the first program for at least one of: the database commit class or the database rollback class, issuing a corresponding commit command with the database or a rollback command with the database; and
in response to receiving a call for the database connection termination class from the first program, terminating the shared database connection.

6. The method of claim 4, comprising:
in response to receiving a database connection initialization call from the first program, creating a transaction instance for the application;

accessing the database by the first program using the shared database connection;
calling the second program, by the first program, as part of completing a unit of work using the database;
accessing, by the second program, the database using the shared database connection as part of completing the unit of work;
in response to a request, from the second program to the first program, for either a commit operation or a rollback operation with the database, calling, by the first program, a corresponding database commit class or database rollback class; and
calling the database connection termination class to terminate the shared database connection.

7. The method of claim 6, comprising in response to receiving a call for the database commit class from the first program, updating the transaction instance to include new information entered in the database from the shared database connection for the unit of work.

8. The method of claim 4, comprising:
receiving, by the first program, a request to initialize a database connection from the second program;
in response to receiving the request, issuing a database connection initialization call by the first program:
creating a transaction instance for the application;
providing, by the first program, a database connection response to the request for the second program;
accessing the database by the second program using the shared database connection;
calling the first program, by the second program, as part of completing a unit of work using the database;
accessing, by the first program, the database using the shared database connection as part of completing the unit of work;
calling, by the first program, at least one of: the database commit class or the database rollback class in response to a unit of work being completed; and
calling the database connection termination class to terminate the shared database connection.

9. An apparatus comprising:
one or more processing devices; and
memory operatively coupled to the one or more processing devices, wherein the memory stores computer program instructions that, when executed, causes the one or more processing devices to:
receive, from an application in a batch environment, a plurality of database transactionality calls associated with a first program of the application, the first program having a first addressability mode; and
in response to at least one of the plurality of database transactionality calls, provide a shared database connection to a database for the first program of the application and for a second program of the application that has a different and second addressability mode.

10. The apparatus of claim 9, wherein the memory comprises program instructions that when executed, causes the one or more processing devices to:
provide a plurality of database transactionality classes, each callable by the first program having the first addressability mode.

11. The apparatus of claim 10, wherein the memory comprises program instructions that when executed, causes the one or more processing devices to:
provide the plurality of database transactionality classes by providing: a database connection initialization class, and in response to a received database connection initialization call, creating a shared database connection for the first program in the first addressability mode and the second program in the different and second addressability mode on an application level.

12. The apparatus of claim 11, wherein the memory comprises executable code that when executed, causes the one or more processing devices to: provide the plurality of database transactionality classes by providing an operating system with a database connection termination class, a database commit class and a database rollback class.

13. The apparatus of claim 12, wherein the memory comprises executable code that when executed, causes the one or more processing devices to:
    in response to receiving a database connection initialization call from the first program,
    create a transaction instance for the application and provide access to the database by the first program and the second program using the shared database connection;
    in response to receiving a call from the first program for at least one of: the database commit class or the database rollback class in response to a unit of work being completed, issue a corresponding commit command with the database or a rollback command with the database; and
    in response to receiving a call for the database termination class from the first program, terminate the shared database connection.

14. The apparatus of claim 13, wherein the memory comprises executable code that when executed, causes the one or more processing devices to, in response to receiving a call for the database commit class from the first program, updating the transaction instance to include new information entered in the database from the shared database connection for the unit of work.

15. A computer program product comprising a computer readable storage medium, wherein the computer readable storage medium comprises computer program instructions that, when executed:
    receive, from an application in a batch environment, a plurality of database transactionality calls associated with a first program of the application, the first program having a first addressability mode; and
    in response to at least one of the plurality of database transactionality calls, provide a shared database connection to a database for the first program of the application and for a second program of the application that has a different and second addressability mode.

16. The computer program product of claim 15, wherein the computer readable storage medium comprises computer program instructions that, when executed:
    provide a plurality of database transactionality classes, each callable by the first program having the first addressability mode.

17. The computer program product of claim 16, wherein the computer readable storage medium comprises computer program instructions that, when executed:
    provide the plurality of database transactionality classes by providing: a database connection initialization class, and in response to a received database connection initialization call, creating a shared database connection for the first program in the first addressability mode and the second program in the different and second addressability mode on an application level.

18. The computer program product of claim 17, wherein the computer readable storage medium comprises computer program instructions that, when executed:
    provide the plurality of database transactionality classes by providing a database connection termination class, a database commit class and a database rollback class.

19. The computer program product of claim 18, wherein the computer readable storage medium comprises computer program instructions that, when executed:
    create a transaction instance for the application in response to receiving a database connection initialization call from the first program, and provide access to the database by the first program and the second program using the shared database connection;
    in response to receiving a call from the first program for at least one of: the database commit class or the database rollback class in response to a unit of work being completed, issue a corresponding commit command with the database or a rollback command with the database; and
    terminate the shared database connection in response to receiving a call for the database connection termination class from the first program.

20. The computer program product of claim 19, wherein the computer readable storage medium comprises computer program instructions that, when executed: update the transaction instance in response to receiving a call for the database commit class from the first program, to include new information entered in the database from the shared database connection for the unit of work.

* * * * *